(12) United States Patent
Cebertowicz et al.

(10) Patent No.: US 11,748,762 B2
(45) Date of Patent: Sep. 5, 2023

(54) SYSTEM FOR SIMULATING AND CREATING SMART PURCHASE AGREEMENTS FROM MASTER SERVICE AGREEMENTS

(71) Applicant: FUJIFILM Business Innovation Corp., Tokyo (JP)

(72) Inventors: Steven Cebertowicz, San Francisco, CA (US); David M. Hilbert, Palo Alto, CA (US); Kandha Sankarapandian, San Jose, CA (US); Ram Sriram, Saratoga, CA (US); Chidansh Amitkumar Bhatt, Mountain View, CA (US); Scott Carter, San Jose, CA (US); Laurent Denoue, Veneto (IT); David Ayman Shamma, San Francisco, CA (US); Shinji Onishi, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 482 days.

(21) Appl. No.: 16/904,488

(22) Filed: Jun. 17, 2020

(65) Prior Publication Data

US 2021/0398136 A1 Dec. 23, 2021

(51) Int. Cl.
*G06Q 30/018* (2023.01)
*G06Q 30/01* (2023.01)
(Continued)

(52) U.S. Cl.
CPC ............. *G06Q 30/01* (2013.01); *G06F 16/27* (2019.01); *G06F 40/40* (2020.01); *G06N 5/04* (2013.01);
(Continued)

(58) Field of Classification Search
CPC .. G06Q 20/027; G06Q 50/188; G06Q 20/381; G06Q 20/065; G06Q 40/02;
(Continued)

(56) References Cited

U.S. PATENT DOCUMENTS 10,333,694 B1 6/2019 Hu et al.
10,445,698 B2 * 10/2019 Hunn ..................... G06Q 10/10
(Continued)

OTHER PUBLICATIONS

Choudhury, O., et al., Auto-Generation of Smart Contracts from Domain-Specific Ontologies and Semantic Rules, 2018 IEEE International Conference on Internet of Things (iThings) and IEEE Green Computing and Communications (GreenCom) and IEEE Cyber, Physical and Social Computing (CPSCom) and IEEE Smart Data (SmartData), Jul. 30-Aug. 3, 2018, Halifax, Canada, 8 pgs.
(Continued)

*Primary Examiner* — Olusegun Goyea
(74) *Attorney, Agent, or Firm* — Procopio, Cory, Hargreaves & Savitch LLP

(57) ABSTRACT

A computer-implemented method, comprising receiving one or more inputs associated with a master services agreement (MSA), and generating an output that includes smart contract information; performing a simulation and receiving user input to interactively adjust the smart contract information and implement a smart purchase agreement (SPA) in blockchain and in a state engine; and automatically generating a smart purchase order (SPO) under the MSA, wherein the SPO is automatically validated for a conflict against the MSA in real-time, and for the case of a conflict, a conflict warning is provided.

20 Claims, 15 Drawing Sheets

(51) Int. Cl.
*G06F 16/27* (2019.01)
*G06N 5/04* (2023.01)
*G06Q 10/10* (2023.01)
*G06F 40/40* (2020.01)
*G06Q 50/18* (2012.01)
*G06Q 30/0601* (2023.01)
*G06Q 10/067* (2023.01)
*G06Q 20/40* (2012.01)

(52) U.S. Cl.
CPC ........... *G06Q 10/067* (2013.01); *G06Q 10/10* (2013.01); *G06Q 20/405* (2013.01); *G06Q 30/0185* (2013.01); *G06Q 30/0633* (2013.01); *G06Q 50/18* (2013.01)

(58) Field of Classification Search
CPC ... G06Q 30/06; G06F 16/3329; G06F 40/134; G06F 21/6209
See application file for complete search history.

(56) References Cited

U.S. PATENT DOCUMENTS

| | | | |
|---|---|---|---|
| 2018/0005186 A1* | 1/2018 | Hunn | G06F 16/93 |
| 2018/0089758 A1* | 3/2018 | Stradling | G06Q 40/04 |
| 2018/0089761 A1* | 3/2018 | Stradling | G06F 12/1408 |
| 2018/0091316 A1* | 3/2018 | Stradling | G06Q 20/065 |
| 2018/0130158 A1* | 5/2018 | Atkinson | G06F 21/6209 |
| 2018/0365201 A1* | 12/2018 | Hunn | G06F 40/134 |
| 2019/0220836 A1* | 7/2019 | Caldwell | G06Q 20/38215 |
| 2019/0243889 A1 | 8/2019 | Carter et al. | |
| 2019/0362446 A1* | 11/2019 | Navarro | G06Q 20/381 |
| 2020/0057994 A1* | 2/2020 | Hunn | G06F 21/645 |
| 2020/0302563 A1* | 9/2020 | Golway | G06Q 50/188 |
| 2020/0327473 A1* | 10/2020 | Zur | G06Q 20/027 |
| 2021/0034816 A1* | 2/2021 | Lall | G06N 5/01 |
| 2021/0083844 A1* | 3/2021 | Knuhtsen | H04L 9/0643 |
| 2021/0357195 A1* | 11/2021 | Zhu | H04L 9/3236 |
| 2021/0374672 A1* | 12/2021 | Hunn | H04L 9/50 |
| 2021/0398136 A1* | 12/2021 | Cebertowicz | G06F 16/3329 |

OTHER PUBLICATIONS highradius.com, Autopilot for Order to Cash & Treasure, retrieved Feb. 1, 2020, 4, pgs. [online] URL: https://www.highradius.com/.

github.com, LexNLP by LexPredict, retrieved Feb. 1, 2020, 3 pgs. [online] URL: https://github.com/LexPredict/lexpredict-lexnlp.

OFS Portal, Automated Price Validation, Feb. 25, 2015, 16 pgs. [online] URL: https://ofs-portal.com/wp-content/uploads/2016/04/Automated-Price-Validation-in-Purchase-to-Pay-Process.pdf.

rasa.com, Build contextual assistants that really help customers, [online] retrieved Feb. 1, 2020, 9 pgs. URL: https://rasa.com/.

sage.com, Pegg: your smart digital assistant, [online] retrieved Feb. 1, 2020, 7 pgs. URL: https://www.sage.com/en-us/products/pegg/.

seal-software.com, Seal Software, [online] retrieved Feb. 1, 2020, 8 pgs. URL: https://www.seal-software.com/.

snips-nlu.readthedocs.io, Snips Natural Language Understanding, [online] retrieved Feb. 1, 2020, 3 pgs. URL: https://www.seal-software.com/.

Altinok, D., An Ontology-Based Dialogue Management System for Banking and Finance Dialogue Systems, 2018, arXiv:1804.04838, 9 pgs.

Azzopardi, S., et al., Integrating Natural Language and Formal Analysis for Legal Documents, 10th Conference on Language Technologies on Digital Humanities, vol. 2016, 2016, 2 pgs.

Hnatkowska, B., et al., Framework for Processing Behavioral Business Rules Written in a Controlled Natural Language, Data-Centric Business and Applications, Lecture Notes on Data Engineering and Communications Technologies, 40, Springer, 2019, pp. 61-75.

github.com, Parser for SBVR SE based on Attempto Parsing Engine (APE), [online] retrieved Mar. 10, 2020, 2 pgs. URL: https://github.com/0xfiras/SBVR-Parsing-Engine.

* cited by examiner

New Exception Claim

| Warranties | Contract Clause Exception Policy |
|---|---|
| Shipping Terms | Exception claims may be submitted within 72 hours of SPO submission. |
| Payment Terms | Select Modifications |
| | Current Value   New Value |
| | ● Ship by date          14 days         [21] days |
| | ○ Late shipment penalty  0.5% SPO |
| | Reason/Explanation |
| | [Text area] |

SYSTEM FOR SIMULATING AND CREATING SMART PURCHASE AGREEMENTS FROM MASTER SERVICE AGREEMENTS

BACKGROUND

Field

Aspects of the example implementations relate to methods, systems and user experiences associated with digitizing and enforcing contractual terms and obligations using self-identifying smart contracts.

Related Art

Related art business to business (B2B) transactions are governed by a master service agreement (MSA) that both companies agree to and share. The MSA dictates the rules of each transaction.

The related art MSA agreements are legally binding and specify a wide variety of arrangements depending on the relationship between the two companies. For example, an MSA between a supplier and buyer might specify how often shipments should occur, how payments should be made, when payments will be due, which parties are responsible for payments, what should happen if and when shipments or payments are not made in time, what should happen if the buyer believes the supplied goods do not meet the standard originally agreed to, etc. Critically, while these contracts describe the rules governing transactions between organizations, the requests, invoices, and other forms used to execute transactions are typically not automatically checked for compliance with the contract.

Related art MSAs are paper forms (PDFs), copies of which both parties sign and store. Typically, each company then has their own method of generating forms and other material to carry out transactions, and the MSA is only consulted when initially creating forms or when there is a disagreement between the two organizations. Since both organizations usually have different transactional systems, and the MSA is only consulted rarely, many related art transactions occur that are in violation of the agreement, resulting in costs to both parties.

FIG. 1 illustrates a related art approach 100 to B2B transaction management. A buyer 101 and a seller 103 negotiate the MSA 105. Subsequent to the negotiation of the MSA 105, purchase orders 107 are generated over a time. As shown in process 109, buyer 101s and seller 103s maintain separate copies, sometimes in different formats, of documents associated with the purchase orders 107. Subsequent to the MSA 105, a purchase order is submitted by the buyer 101 to the seller 103. The seller 103 subsequently sends an order confirmation to the buyer 101. The seller 103 prepares and provides goods to the buyer 101. The seller 103 send the invoice to the buyer 101, which processes the invoice. The buyer 101 sends a payment to the seller 103, and the seller 103 receives the payment. At that point, the purchase order is complete, and this process continues for subsequent purchase orders 107. As noted above, each the buyer 101 and the seller 103 separately store copies of the documents, such as purchase order, order confirmation, invoice, payment information, etc.; additionally, the MSA 105 is not consulted each and every time that a purchase order is submitted and the purchasing process is performed.

There is an unmet need in the related art to develop a solution to help organizations in a B2B MSA to ensure MSA compliance in transaction activities.

SUMMARY

According to an aspect of the example implementations, comprising receiving one or more inputs associated with a master services agreement (MSA), and generating an output that includes smart contract information; performing a simulation and receiving user input to interactively adjust the smart contract information and implement a smart purchase agreement (SPA) in blockchain and in a state engine; and automatically generating a smart purchase order (SPO) under the MSA, wherein the SPO is automatically validated for a conflict against the MSA in real-time, and for the case of a conflict, a conflict warning is provided Example implementations may also include a non-transitory computer readable medium having a storage and processor, the processor capable of executing instructions associated with digitizing and enforcing contractual terms and obligations using self-identifying smart contracts.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which:

FIGS. 4A-4E are an example user experiences;

DETAILED DESCRIPTION

Figure 1:
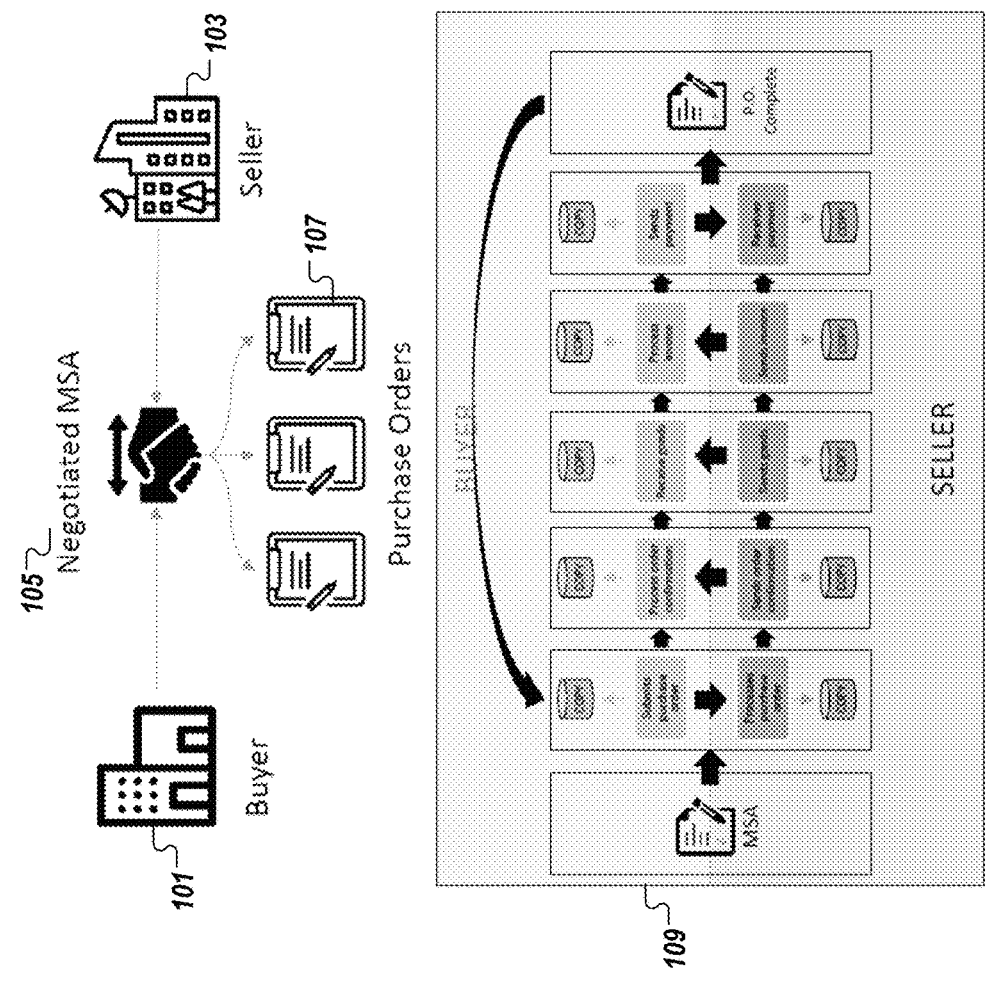
FIG. 1 is a related art approach.

The following detailed description provides further details of the figures and example implementations of the present application. Reference numerals and descriptions of redundant elements between figures are omitted for clarity. Terms used throughout the description are provided as examples and are not intended to be limiting.

The present example implementations may address problems and disadvantages associated with the related art MSAs, which are inert documents that are not able to efficiently enforce their compliance automatically. The present example implementations address the contract compliance and costs control required by replacing manual compliance checking and contract violations with an operationalized approach. More specifically, the example implementations are directed to converting MSA documents to active Smart Purchase Agreements (SPAs) that can automatically enforce contract terms and conditions. A smart contract according to the example implementations convers opaque and siloed transactions to a single inspectable and open system that can automatically enforce the contract terms in the MSA to verify compliance and reduce costs associated with manual compliance checking and contract violations.

The example implementations combine document analysis with modules that encapsulate functionality, both to carry-out a specific clause or condition in an MSA, and to detect that it has relevance for a particular MSA. The combination of all modules necessary to execute the clauses specified in the MSA constitutes the SPA. When a buyer is ready to make a purchase under the terms of the MSA, the newly created SPA is used to initialize a Smart Purchase Order (SPO). As discussed herein, the SPA corresponds to the MSA, and the SPO corresponds to the purchase order.

According to the example implementations, the module contents may include information in various aspects. For example by way of limitation, the modules may include, but are not limited to a text summary having applicable clauses, terms or conditions that the model lies, including related definitions, as well as a reference to a smart contract, with clear definitions and mapping for all of the terms and variables that are contained within its code, as well as their corresponding intent. References and conclusions may also be provided, for integrations that are capable of triggering functions that may enforce or verify some or all of the covered terms.

Further, a self-identifying function may be provided, that includes a set of reference language and/or a model for self-identification of enforcement logic and extraction of any related variables or arguments from legal contracts. Additional aspects may include a contract approval function, which allows a coordination service to execute a contract approval workflow, such that all involved parties may digitally sign and accept the smart contract as a true representation of the MSA. Optionally, an exception handler may be provided to define the process and methods by which the originally established and agreed upon terms of the provided contract may be modified, for a single instance, in the event of an exception.

Figure 2:
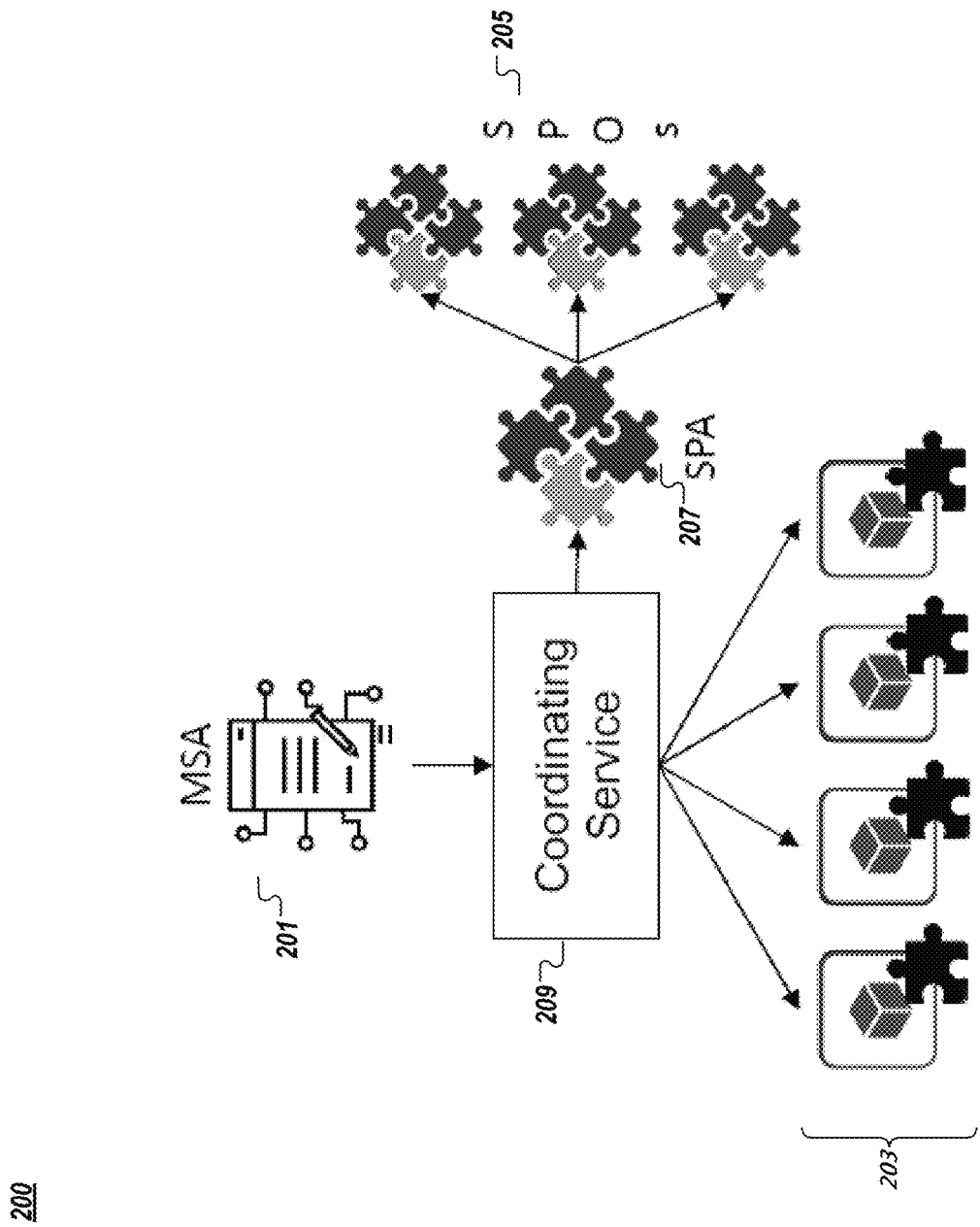
FIGS. 2 and 3 are functional block diagrams of example implementations.

FIG. 2 illustrates a high level disclosure 200 of the example implementations. More specifically, an existing MSA 201, and modules 203, as will be described in greater detail below, are provided. Further, the SPA 207 and corresponding SPOs 205 are generated by a coordinating service 209. Accordingly, the example implementations employ packaged modules that encapsulate functionality to execute a specific term or condition of an MSA, and to detect its relevance with respect to the associated agreements and activities automatically.

Figure 3:
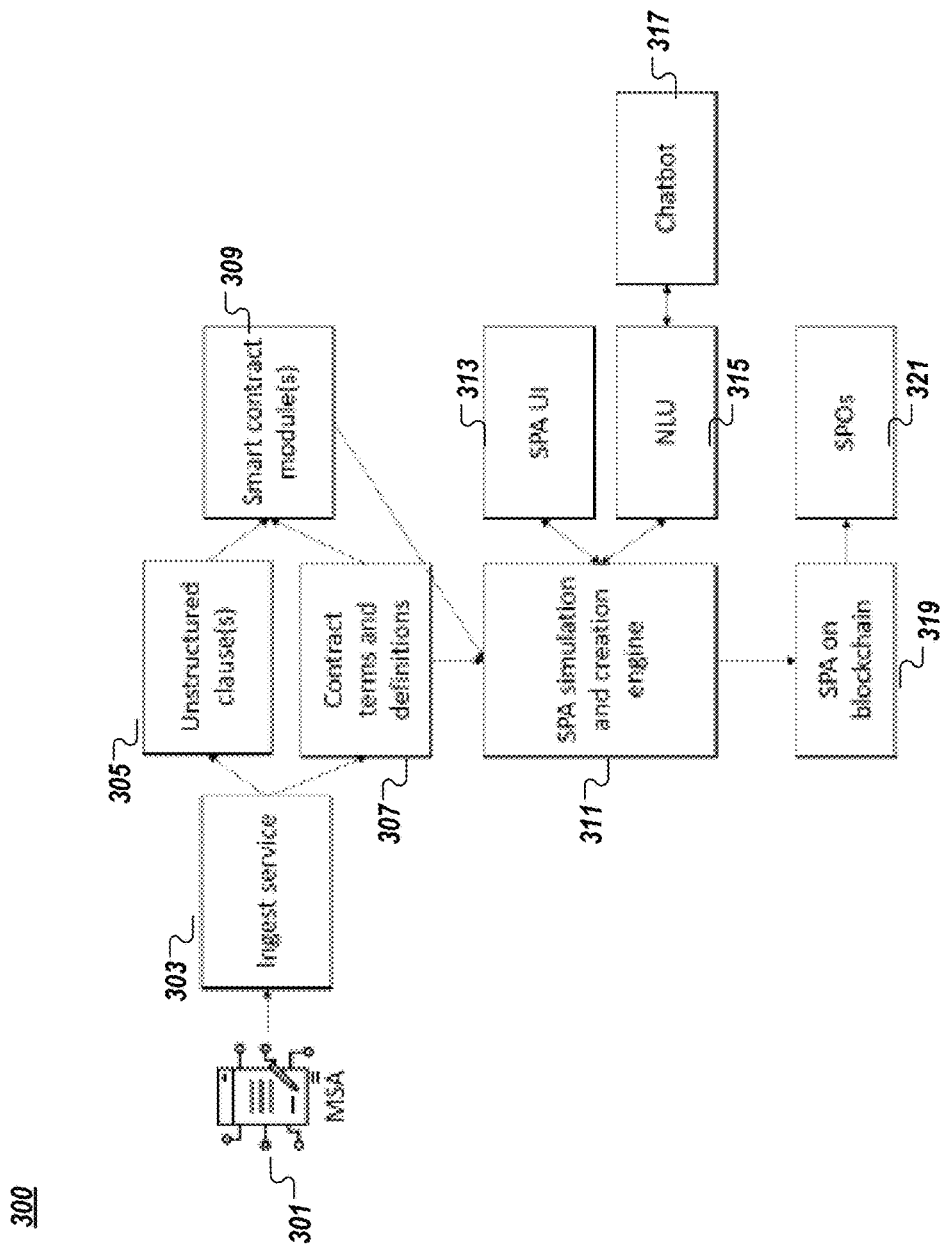

FIG. 3 illustrates modules 300 according to the example implementation. To generate the SPA from the MSA, the SPA is processed to extract contract terms and definitions as well as unstructured clauses (e.g., clause titles and body text). Each unstructured clause is then matched to a smart contract module that encapsulates code for extracting parameters and numerical values specific to that clause. These parameters are injected (e.g., into a JSON file) along with the pre-processed terms and definitions and fed to a simulation and creation engine. A user interface (UI) and chatbot can interact with this engine to simulate different scenarios. The UI and chatbot can then instruct the engine to create an SPA on the blockchain, which in turn can be used to generate SPOs.

More specifically, the MSA 301 is input into an ingest service 303. The ingest service 303 processes the MSA in a manner that results in the extraction of unstructured clauses 305, and contract terms and definitions 307. The extracted unstructured clauses 305 extracted contract terms and definitions 307 are output to a smart contract module 309. The smart contract module 309 generates parameters, which may be injected into the JSON file, along with preprocessed terms and conditions.

The output of the smart contract module 309 as explained above is provided to an SPA simulation and creation engine 311, which may also receive contract terms and definitions as extracted at 307. The SPA simulation creation engine 311 interacts with the UI for the SPA at 313, as well as a natural language unit 315, which may interface with a chatbot 317 to communicate with users.

Based on the foregoing interactions, the SPA simulation and creation engine 311 generates the SPA on a blockchain at 319. Further, at 321, a module to generate the SPOs is provided.

FIGS. 4A-4D illustrate example user interfaces associated with the present example implementations, including an example rendering of a contract simulator user interface. Such example interfaces may be used to help the parties verify that the SPA correctly operationalizes the behavior intended by the MSA and to simulate the outcome of SPOs under various conditions when conducting transactions.

Figure 4A:
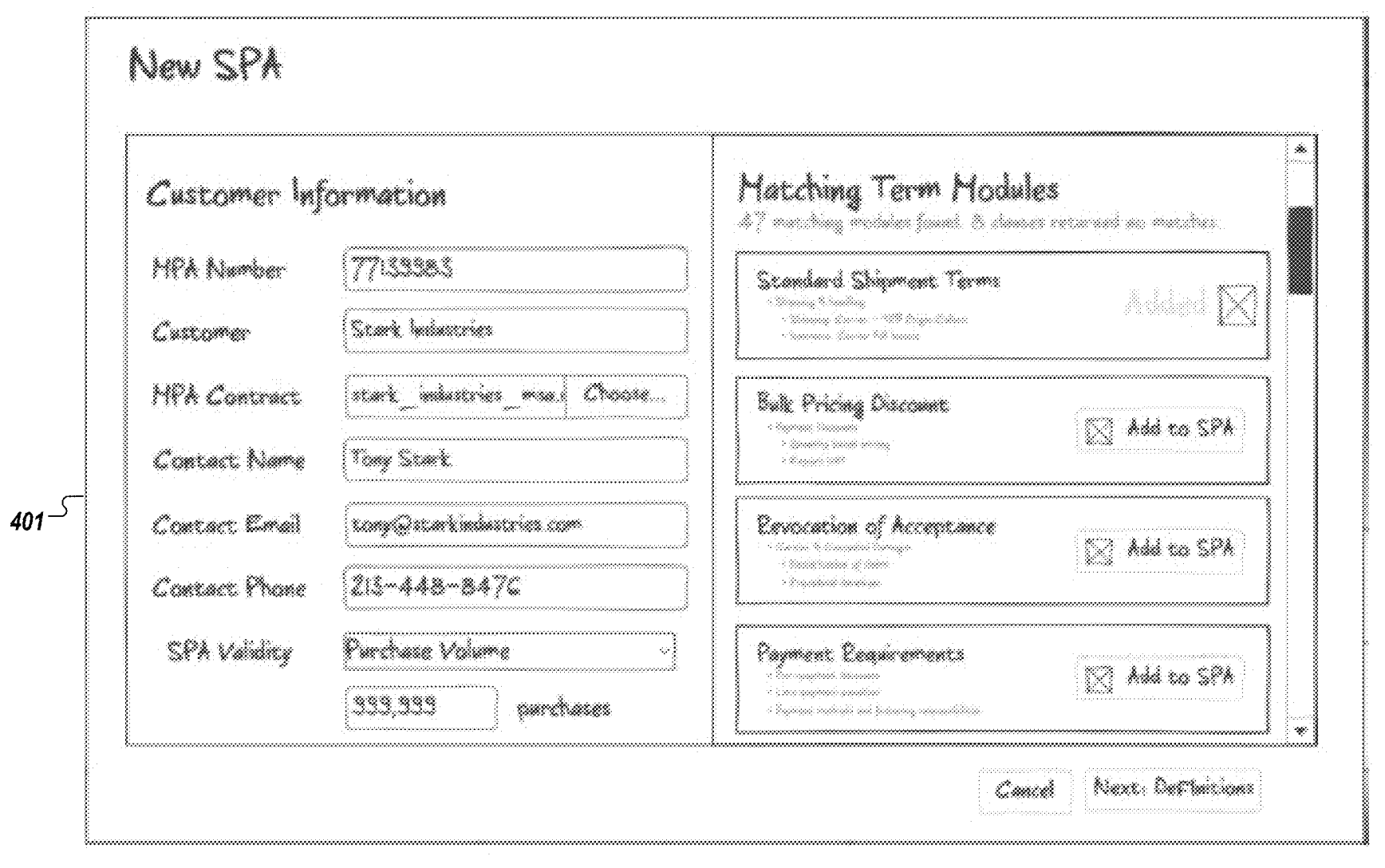

FIG. 4A illustrates an input interface for a new SPA 401. On the left side, customer information is included, and on the right side, matching term modules are generated. The user may determine whether or not to add the matching term modules to the SPA. Further interfaces may be provided for additional aspects of an SPA, such as definitions or the like.

More specifically, a user may supply the MSA to the coordinating service. The coordinating service converts the MSA into an executable SPA, by extracting terms and invoking a set of known modules within the MSA. According to one example, a module may search for patterns, such as a supplier side agreement to send goods within a certain number of days of receiving a request, or a buyer side agreement to send payment within a certain number of days of receiving the goods. When the coordinating service determines that a match exists, coordinating service will automatically add a reference to the relevant module to the SPA. The user may also provide the coordinating service with a rule base, or a playbook, including a set of rules and parameters that govern contract negotiation positions. More specifically, as modules are identified, they may be processed to determine whether there is a conflict with the rule base, and if so, alternative modules or contract parameters may be suggested during the SPA negotiation. The file SPA may be written to the blockchain, where it can be used in the future to generate and execute individual purchases associated with the SPA, such as the SPOs.

Figure 4B:
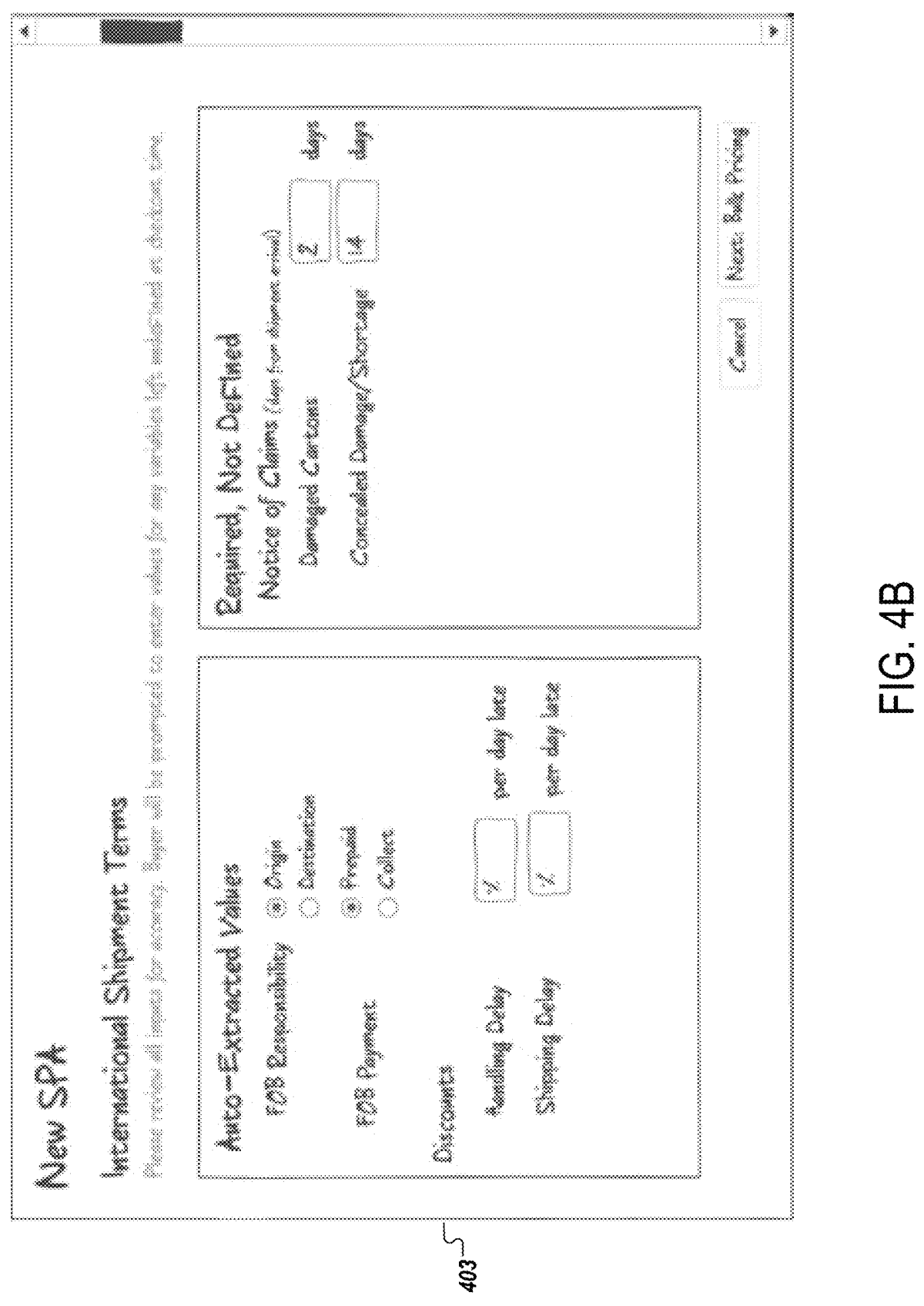

FIG. 4B illustrates an example interface 403 associated with the international shipment terms for a new SPA according to the example implementations. Here, the user may enter information about responsibility, payment, discounts and claims.

Figure 4C:
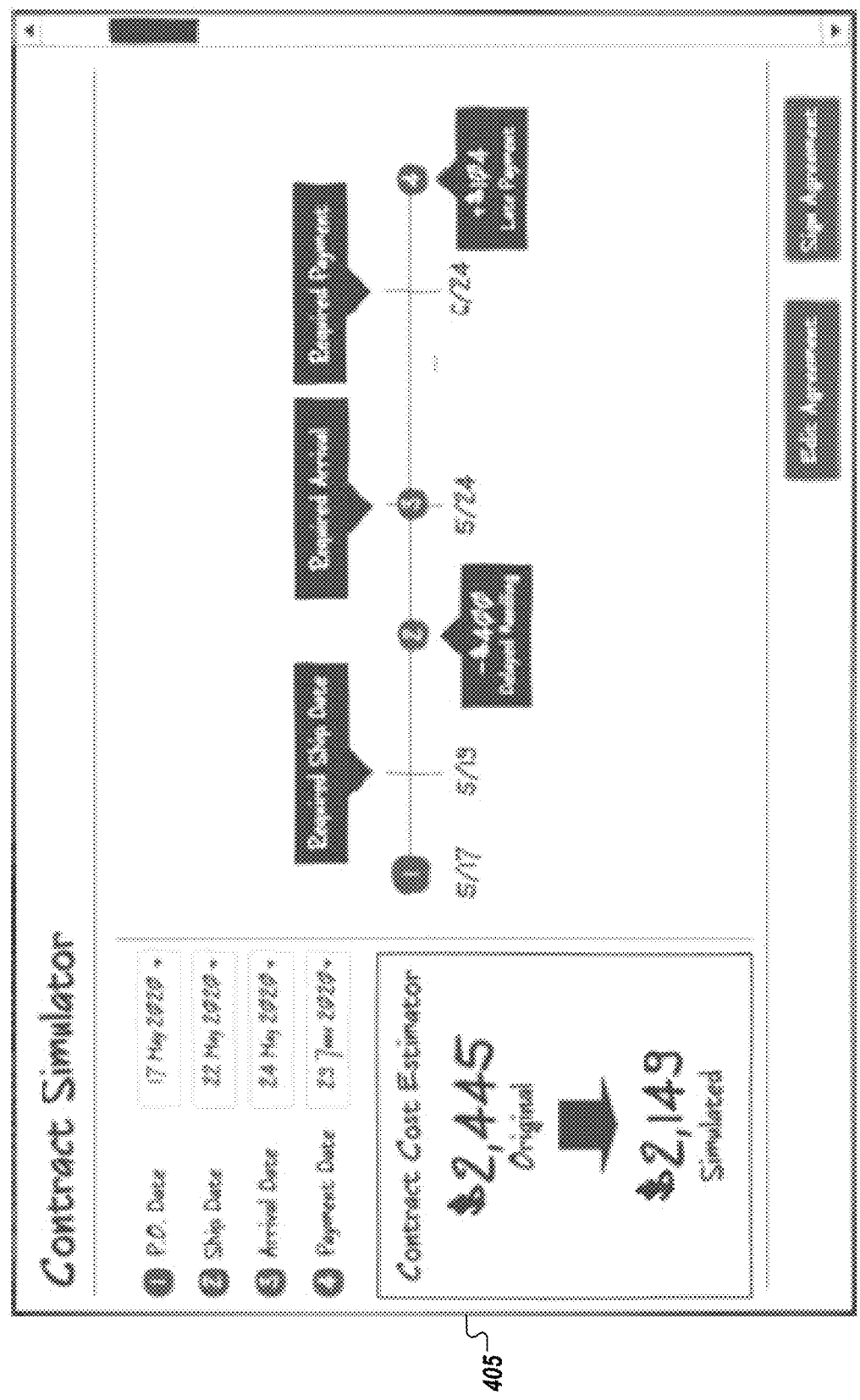

FIG. 4C provides an example interface associated with a contract simulator 405. More specifically, the dates associated with a purchase order shipment, arrival and are provided, and a simulated contract cost is provided. In this example implementation, the contract simulator provides information associated with the cost of delayed handling and the cost of late payment, and provides the user with the opportunity to either enter the agreement or sign the agreement.

Figure 4D:
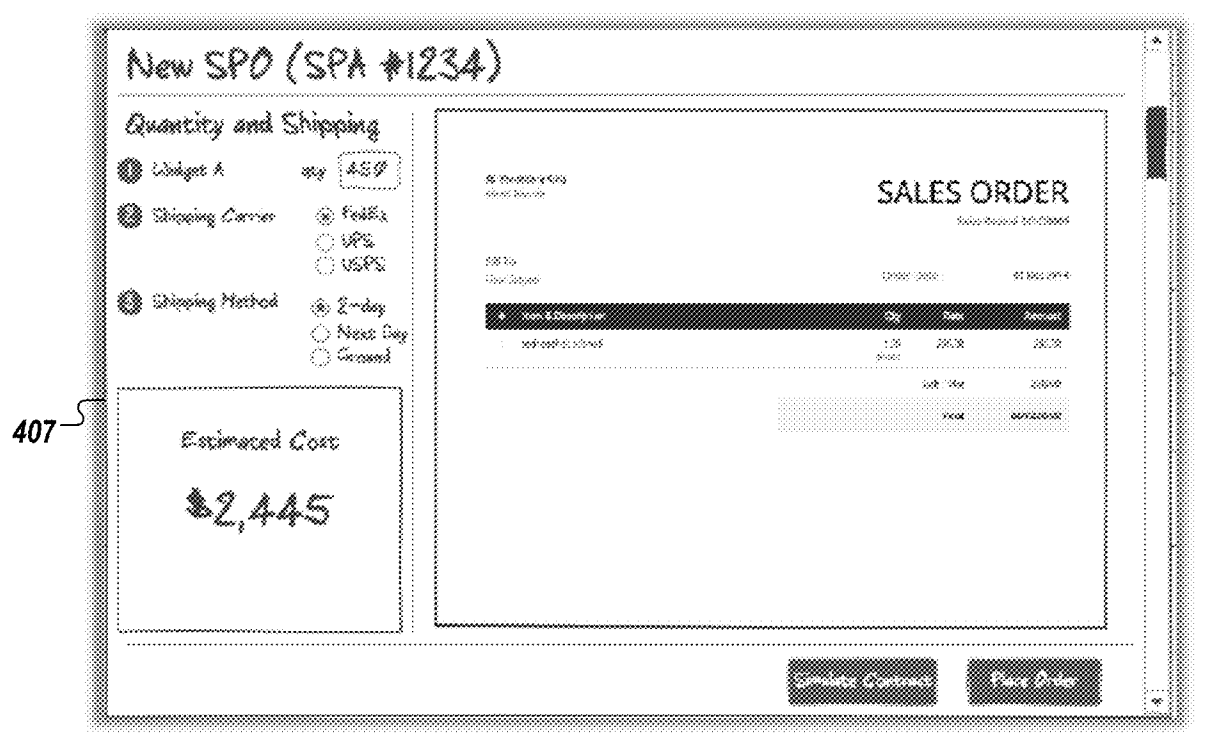

FIG. 4D illustrates an example user interface 407 associated with the example implementations. More specifically, the sales order is provided, along with quantity shipping information as well as the estimated cost. Accordingly, the contract may be simulated or the order may place by the user. Thus, the SPA and the SPO are associated with one another.

More specifically, the SPA may be used to automatically generate this user interface to create and submit SPOs that conform to the MSA. For example but not by way of limitation, bulk pricing may be applied after a buyer enters a quantity of a specific item at check out, and other inputs that were not previously defined may be clarified. The interface associated with the SPO requests the user to provide input for any required but undefined variables that are included in SPA, and further operationalizes purchase order specific logic. For example but not limitation, a bulk pricing discount may be applied, depending on a quantity order. SPOs may maintain an immutable state for each transaction which is updated by the functions described in the SPA, which may be triggered sequentially, at a specific time, or by third-party integrations.

Further details of the foregoing modules according to the example implementations are disclosed in greater detail as follows.

The ingest service 303 may 1) find and extract contract terms and their definitions and 2) find and extract individual contract clauses. To process documents, a library (e.g., LexNLP) is provided for working with unstructured legal text including the contracts such as MSAs. To extract terms and conditions, the system relies on pattern-based extraction methods to find and extract definitions (e.g., lexnlp.extract.lang.definitions). The example implementations structure this output into a JSON object, with terms and definitions as (key, value) pairs. Terms and conditions are forwarded directly to the SPA simulation and creation engine 311, which is described in greater detail. To extract clauses segmentation methods (e.g., a function specified in lexnlp.nlp.en.segments.sections) to extract section titles and body text.

The output of the ingest service 303 are forwarded for further processing in subsequent modules 305, 307 and 309, as explained below. More specifically, unstructured clauses are matched against smart contract modules. Unstructured clauses initially include only titles and body text. The unstructured clauses are matched against well-known smart contract modules. Optionally, the user or entity may provide the matching service with a playbook (e.g., guidelines and parameters that dictate an organizations contract negotiation positions).

As modules are identified, they can be matched for conflicts with the playbook, and alternative modules or contract parameters can be suggested for the negotiation process. The concept of playbook compliance can be further extended to surface contract irregularities from past SPAs created, or factor the counterparty's compliance history to suggest modifications to new SPAs between the two parties.

Accordingly, the smart contract module 309 may include various aspects. For example the smart contract module 309 may generate a text summary of the applicable clause, term(s) or condition(s) which the module applies, including any related definitions, as well as a reference to a smart contract with clear definitions and mapping for all terms and variables contained within its code and their corresponding intent. The smart contract module 309 may also generate references and inclusions for any integrations capable of automating enforceability or verification of some or all of the covered terms.

Further, the smart contract module 309 may include additional functions. For example but not by way of limitation, the smart contract module 309 may include a self-identifying function which determines whether the clause matches a given unstructured clause, an analysis function which extracts enforcement logic and extracts related variables or arguments from an unstructured clause, and/or a contract approval function, which allows the coordination service to execute a contract approval workflow where all concerned parties can digitally sign and accept the modules as a true representation of the MSA.

The smart contract module 309 may also include a self-identifying function that may, for example but not by way of limitation, match the title against the title of a given unstructured clause (e.g., within some edit distance). Since contracts may be written against a standard legal boilerplate that varies far less than standard personal writing, the title may be sufficient. However, the present example implementations are not limited thereto, and other self-identifying functions may be employed in combination with or in substitution for the matching of the title.

If a module's self-identifying function matches an unstructured clause, the analysis function is applied to the unstructured clauses body text to extract relevant logic and parameters. Smart module authors can use any method to extract this content, but the library (e.g., LexNLP) includes various conditions, constraints, distances, durations, money, percent and rates.

In some cases, the self-identifying function may not be able to confidently resolve all parameters. In such situations, the smart contract module 309 may query the user via a webpage or app to address ambiguities.

The SPA simulation and creation engine 311 receives inputs from the smart contract module 309 and the well-structured terms and definitions 307, which have been matched to clauses in the MSA, and provides a query API. For example but not by way of limitation, the query API may be provided as follows:
  listAllTerms
  getDefinition(term)
  listAllContracts
  getContractDescription(contract)
  onException(contract, handler, [option1,option2 . . . ])
  simulateContract(contract,[option1,option2 . . . ])
  createSPA([contract,[option1,option2 . . . ],[contract,[option1,option2 . . . ] . . . )

It is noted that getContractDescription includes a description of all parameters and logic contained in a smart contract. Applications can simulate the behavior of each contract with simulateContract under different sets of parameters.

The SPA simulation and creation engine 311 can be instructed to create a new SPA with a given set of contracts and parameters. According to some example implementations, every clause in the MSA is linked to a smart contract module 309. In that case, the union of all of the identified modules may constitute a complete SPA.

However, some aspects of the MSA may not be covered by existing modules. Thus, the user may be required to create a new module to support that case, or to forego inclusion in the SPA altogether. Accordingly, manually created modules can be verified and ultimately connected to the coordinating service 209 for reuse.

Once the SPA is completed by the SPA simulation and creation engine 311, it is encoded in the blockchain at 319, for subsequent use to generate individual instances at 321, such as SPOs, that maintain an immutable state for each subsequent transaction between the two parties that is covered by the original MSA. Prior to the encoding in the blockchain at 319, the parties may confirm the execution of the agreement. Further, the foregoing simulation and creation engine 311 may operate to include an SPA that has already been encoded into the blockchain at 319, and these features may operate interactively and/or in parallel, as well as in sequence as disclosed above.

For example, a transaction for 10 widgets is created using the finalized SPA s1. A new SPO instance o1 is generated from s1 and initialized with arguments for the quantity qx and price px for each item included in the purchase order. Smart Contract m1 of the SPO generates a shipment tracking number and persists the value into the SPO's active state. The tracking number retrieved by m1 is later passed into m2, which calls the shipping carrier's API to retrieve the status of the shipment.

The API returns a response that the goods were received in x2 days after receiving a request, where x2>x1. In accordance with the rules encoded into m2, a discount is automatically applied to the purchase order (e.g., an amount specified in the MSA and encoded into the SPO/SPA), and the new order value persists the SPO's state. Later, the payment is automatically executed by m3 using the active state value.

According to the example implementations the foregoing modules may be configured to output to the blockchain a summary of each transaction. The summary may include, but is not limited to, dates, costs, fees, compliance issues, etc. This summarization may generate an easily auditable event log for all transactions associated with a given MSA.

As noted above, an SPA UI module 313 provides a UI that can interact with the simulation and creation engine 311 to simulate SPOs that conform to the MSA. The SPO UI 313 requests user input for any required but undefined variables included in the SPA, and operationalizes purchase order-specific logic (e.g., a bulk pricing discount may applied depending on the quantity ordered).

The SPA UI 313 may also simulate outcomes under various conditions. Smart contract modules provide interfaces for executing the contract for simulation purposes. This output may be used to: (a) help verify that the SPA correctly operationalizes the behavior intended by the MSA, and (b) simulate the outcome of SPOs under various conditions when conducting transactions.

The NLU 315 and chatbot 317 are further explained as follows. The chatbot 317 may interact with the simulation and creation engine 315 in a manner similar to the SPA UI 313. The chatbot 317 is associated with the NLU 315 that has been trained on the specific verbiage typical for a given type of MSA. Several different NLUs may be included and trained on different MSA types, simultaneously (for example, one NLU might support a standard buyer/seller arrangement, another might support product licensing, another leasing, etc.). NLUs (e.g., Rasa [4] and Snips [8]) convert user commands to actionable queries (for example, they can convert the request, "What happens if I pay an invoice 1 week later" into a function and associated parameters: simulateContract(invoicePaymentContract,[user,contract,date]).

The query service keeps a list of all of the contracts associated with each user. The chatbot 317 may track the most recent contract with which the user interacted, so that the user does not need to re-confirm the contract about which they are currently discussing for every query and conversation with the bot.

A query may return several answers. If this occurs, the interface may present the answers by ranking order. In addition, the interface may provide snippets of the document fragments from which the answers were inferred, to provide the users with context to understand the answers. For example, but not by way of limitation, the interface can have a "source" button that reveals the snippets behind each answer. Further example implementations of the NLU 315 may provide functionality to learn from user feedback about the fragments most helpful to users for understanding the answers. In turn, more semantically meaningful segments may be recommended to users.

Figure 5A:
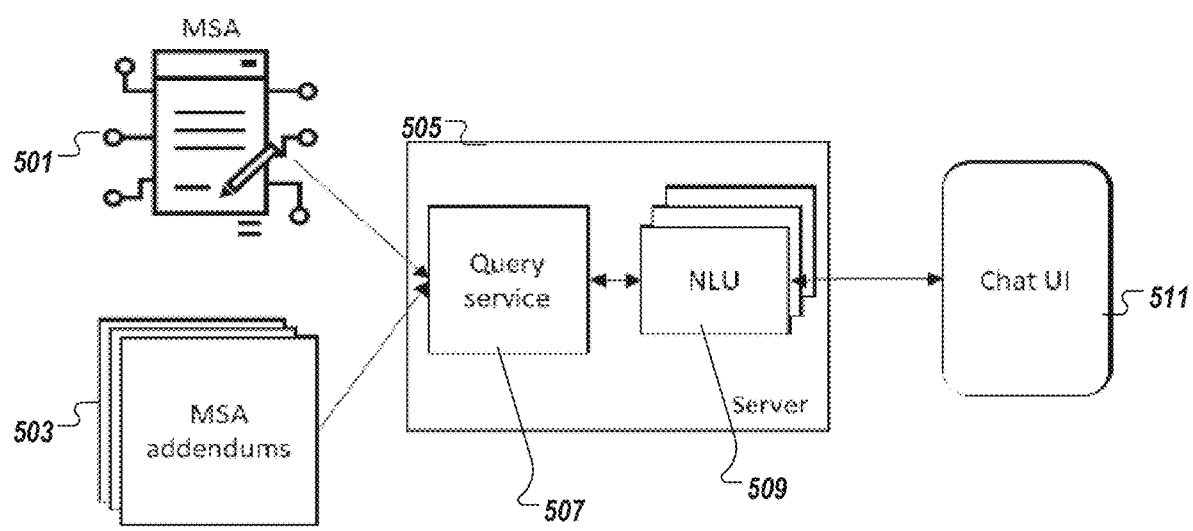
FIGS. 5A-5B is an example implementation illustrating a chat aspects.

FIG. 5A illustrates an example schematic 500 associated with the query. More specifically, an MSA 501 and MSA addendums 503, are provided as inputs to a server 505. The server 505 includes instructions to execute functionality associated with the query service 507, and also includes the one or more NLU processors 509, as explained above. The server 505 interfaces with a user via a chat UI 511, or chatbot as explained above.

For example, the chatbot interface may convert natural language utterances by a user into actionable queries, to simulate contract outcomes. One or more NLUs that have been trained on specific verbiage that is difficult for a given type of MSA or clause are provided. Further, ambiguities may be addressed by requesting the user to make a choice between different clauses and/or contracts. Further, user selections may be used to further train the system. The query service may be configured to notify users of updates to an MSA, or one or more individual SPOs. For example but not by way of limitation, a query provide inquiry as to the types of fees or discounts that may be applied if payment occurred on one date or another. Factual queries of specific clauses may also be requested, such that if the clause is found, then the specific text of the clause is sent in the chat, and if the clause is not found, then the user can request for the clause to be added. The chat may also notify a user of changes to the contract, and how those changes might impact an SPO. User input may be used as historical information to further train the module for future use, with machine learning approaches.

Figure 5B:
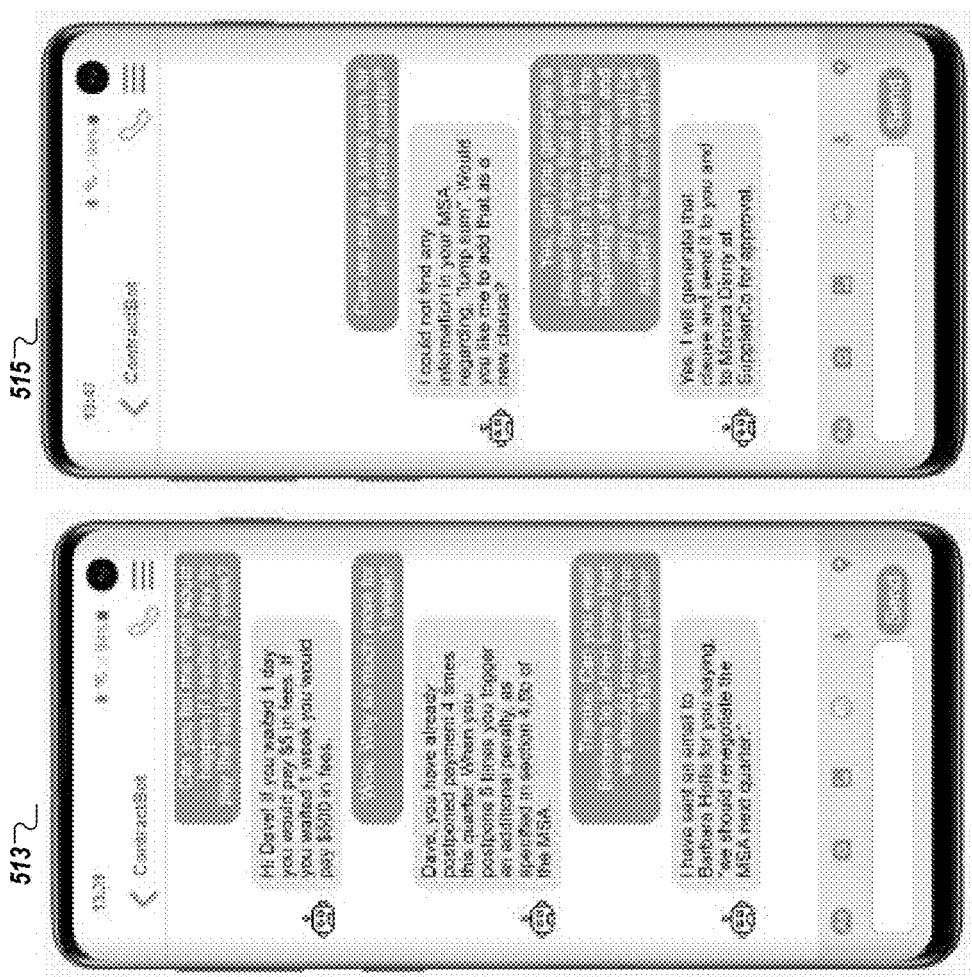
Figure 5B:
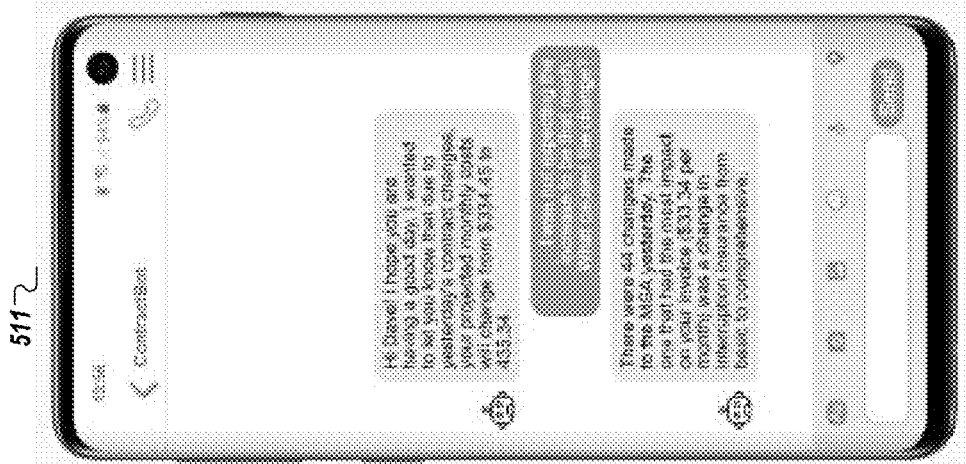

FIG. 5B illustrates example interfaces 510 associated with the chatbot according to the example implementations. As shown in 511, a user asks a question, and the chatbot corresponds with the remote service, but it cannot find the given clause and begins the process of amending the MSA to include it. As shown in 513, the same user asks the service to simulate what would happen if the user paid an invoice at two different dates in the future. As shown in 515, the query service can be notified of changes in an MSA and its associated appendices. In this case, it can re-run past transactions to detect if there will likely be a change in future fees for a given agreement. If so, it can notify the user.

The query service may respond to different types of queries. As shown at 511, questions about the MSA may initiate changes in the MSA itself if no relevant clause is found, and at 513, simulations of future transactions or about actual transactions such as Purchase Orders (PO) that were instantiated based on this MSA.

The query service may also register to receive notifications of changes in the MSAs and addendums, and be configured to automatically run the most recent set of transactions through the updated fee schedules. Any change is detected that can cause alarm, the query service can proactively alert the user, as shown, for example, in 515, where a large change triggers this warning. However, the present example implementations are not limited thereto, and another threshold could be set to trigger a notification based on a user determination with respect to a rule or amount, for example.

In addition to the foregoing example implementations of the modules, the present example implementations further provide exception handling functionality. Due to the inherent rigidity of the contract execution, it may be impractical to honor certain programmed requirements when unforeseen situations arise that vendors and suppliers might otherwise waive under the prevailing circumstances.

When creating a new SPA or submodule, parties may specify a separate smart contract, which can be triggered or invoked for single instance exceptions. For example, business operating in different countries may be observing different holiday schedules, or there may be global or regional shipping disruptions due to inclement weather, government-imposed trade embargos or public health emergencies (e.g., pandemic). Since all possible scenarios cannot be considered and programmed into the original contract, a mutually agreed-upon protocol for mediating exceptions can be programmed into a separate contract, and invoked for a particular SPA or clause module, using the onException example implementation.

More specifically, the programmed exception handling aspects dictate the process by which the originally established terms of a contract may be modified for a single contract instance, in the event of an exception. This example implementation may be invoked by the impacted party from the UI, where they can then specify (e.g., by wizard) the necessary contract changes to satisfy the fair execution of the contract.

FIG. 4E illustrates an example rendering of an exception claim interface 409. A new exception claim invokes the onException method for the given contract, which utilizes a pre-programmed process to ensure fair settlement of the contract in the event of extenuating circumstances not covered by the original contract.

Once an exception is granted according to the specified logic, the contract instance is modified and a record of the change is stored on the blockchain.

The level of flexibility provided by the exception handling contract, including which clauses, terms and definitions may be modified, is to be determined by the participating parties, and may or may not include neutral third parties to verify the authenticity of an exception claim and/or arbitrate disputes. Additionally, multiple exception handlers may be utilized to create a dispute escalation process to provide for the most efficient handling of exceptions while ensuring fallbacks in the event that either party feels a handler is being abused.

Examples of possible exception handling protocols include, but are not limited to:

Counterparty Notification Required—the impacted party must inform the other party of the exception; at which time the modification will be applied to the contact. Certain conditions may be included, such as informing the counterparty within a specified timeframe.

Verification from Independent Party Required—a mutually agreed upon third party will be responsible for reviewing and approving any exception request.

Counterparty Pre-approval or Negotiation Required—the contract modification will be applied only after the counter party approves the exception. The parties may propose onetime modifications to other clauses, or new amendments to the SPA altogether.

Figure 9:
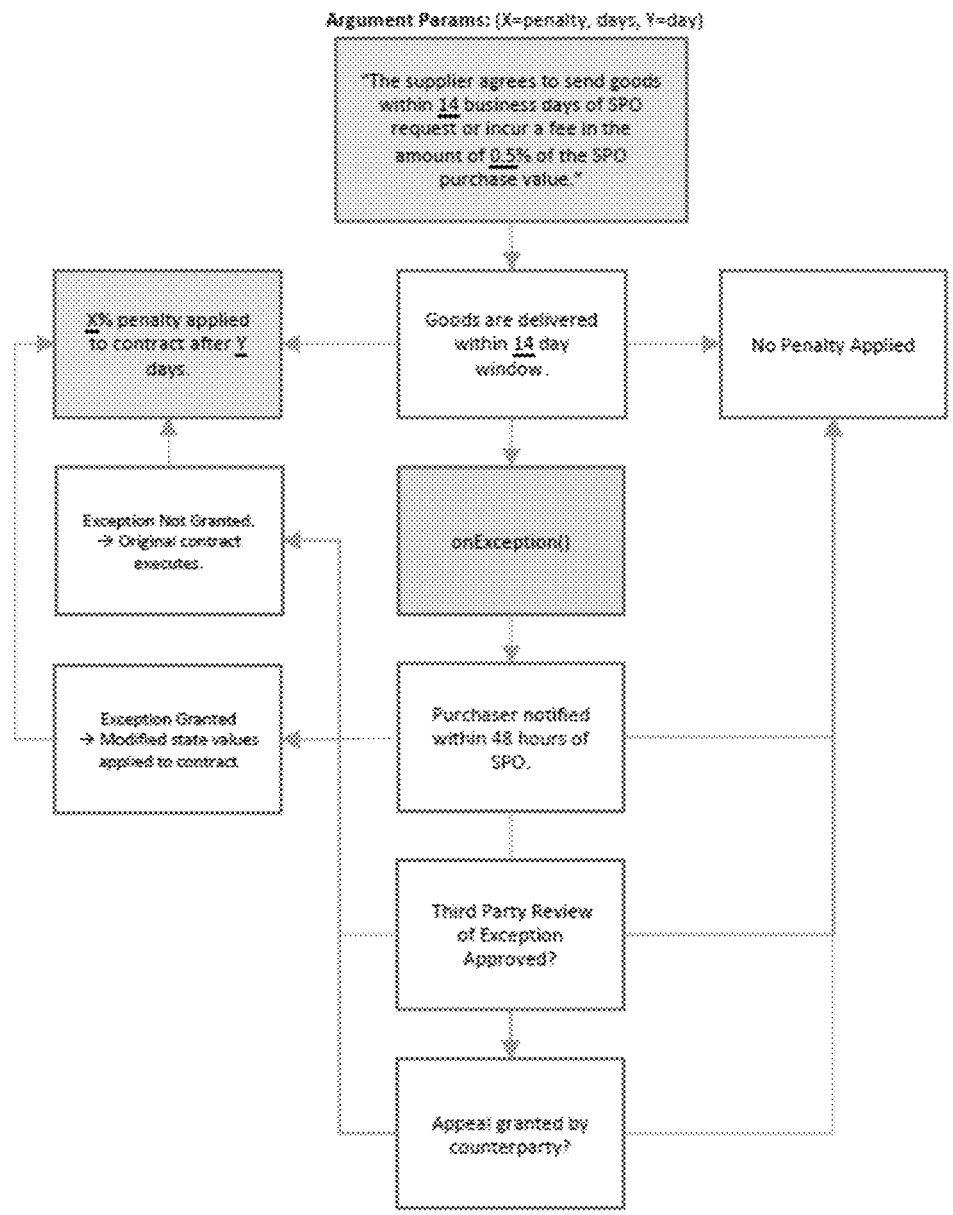
FIG. 9 is an example exception handling flow according to the example implementations.

FIG. 9 illustrates an example flow of an exception handling protocol 900. More specifically, multiple handling methods are integrated to form a single escalation process for dispute resolution, applied to an individual shipping contract term where a penalty is applied to an SPO on late delivery of goods. It is noted that multiple exception handling protocols may be combined, into a single exception handling escalation protocol.

Figure 6A:
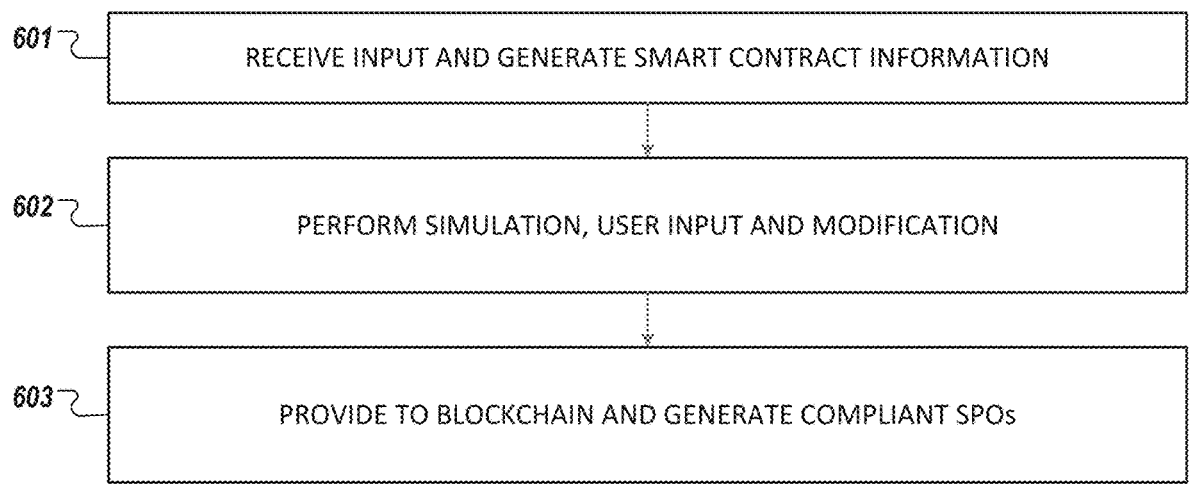
FIGS. 6A and 6B are flowcharts of an example implementation of a method according to the disclosure.
Figure 6B:
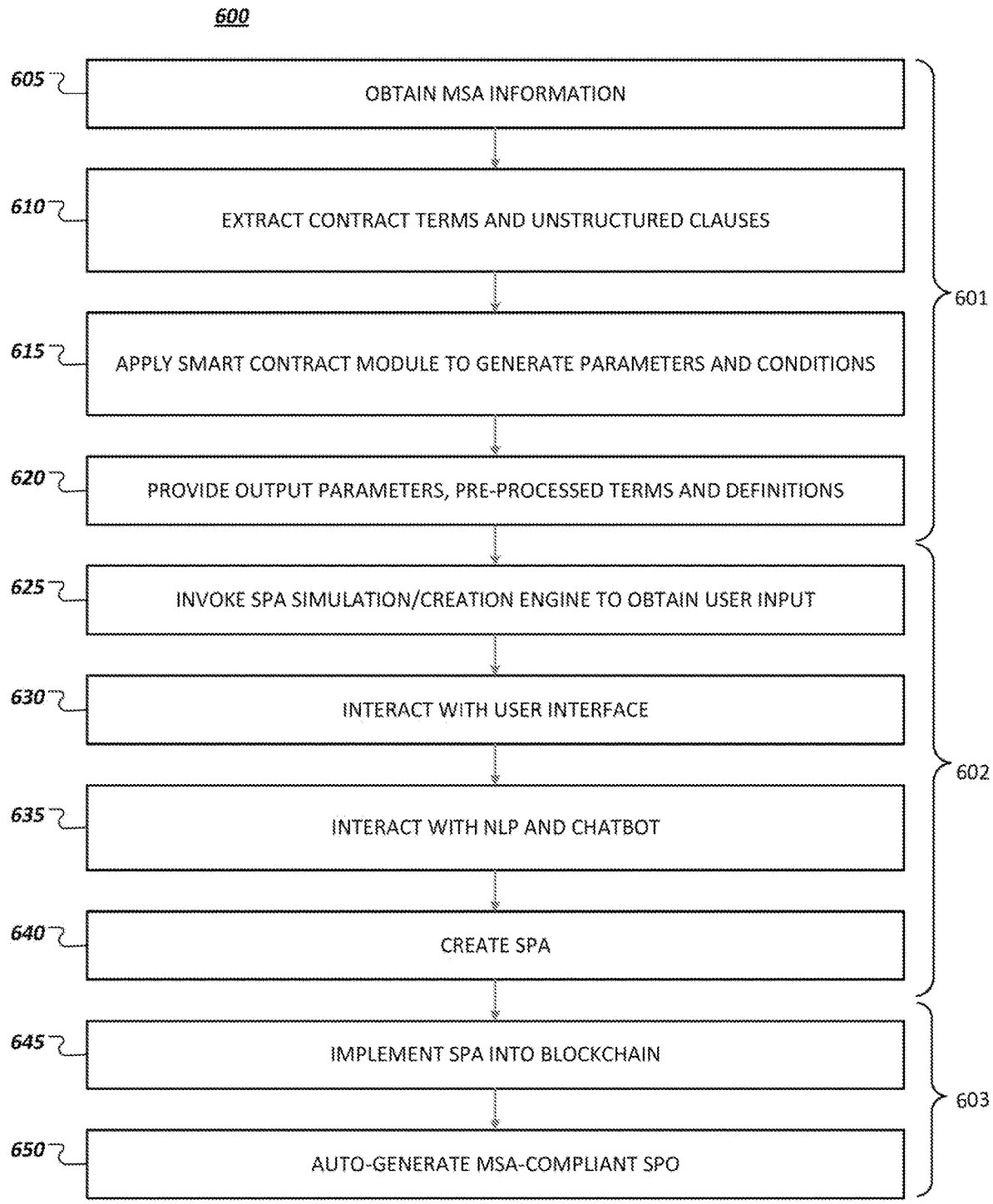

FIGS. 6A and 6B are a flowcharts of an embodiment of a method for according to the disclosure. A method 600 can be implemented by one or more processors in a computing environment (e.g., the computing environment described below). As shown in FIG. 6A, the method 600 can be a combination of multiple sub processes, including at 601, receiving one or more inputs associated with the MSA, and generating an output that includes smart contract information. At 602, simulation is performed, along with review of user input by UI and/or chat functions to interactively make necessary adjustments in the SPA and to create the SPA. At 603, the SPA is implemented blockchain and in a state engine, such that when an SPO is generated, the necessary interaction interface is provided to ensure that the SPO is compliant with SPA. The specific details of the foregoing operations 601-603 are disclosed above and with respect to the description of FIGS. 1-5 and 9.

In more detail, FIG. 6B illustrates an example process associated with the present example implementations. While the operations described herein are sequenced according to the drawings, the present plantations are not limited thereto. For example, the sequence of operations may be changed, and operations may be combined, separated or deleted, without departing from the inventive scope.

At 605, the MSA information is input into ingest service, as explained above. Accordingly, the SPA may be generated from the MSA by further processing.

At 610, the MSA is extracted, to generate contract terms and definitions, as well as unstructured clauses.

At 615, each unstructured clause is matched to a smart contract module that extracts parameters, as well as pre-processed terms and conditions.

At 620, the parameters, preprocess terms and conditions associated with the SPA are generated. As explained above, code is provided for extracting parameters and numerical values specific to a clause. The output is fed to a simulation and creation engine, along with contract terms and definitions as extracted.

Accordingly, various operations associated with operations 601 are performed. Further operations associated with operations 602 and 603 are described as follows.

At 625, the SPA simulation and creation engine, which receives the outputs of 620, is invoked, to perform simulation and obtain user input. Examples of user input are described above respect to additional figures described herein.

At 630, the simulation and creation engine interacts with a user interface, such as an application or web browser based interface.

At 635, a natural language unit is provided, along with a chat function, to communicate with one or more users via chat. As explained above, the content of the simulation under certain conditions, using the NLP to process questions, hypotheticals, changes, etc. By interacting with the user performing the simulations, the example implementations may also receive commands to modify the SPA, consider exceptions, handle in accordance with a rule base or playbook, or other information associated with a user input to the SPA.

While the foregoing operations of 630 and 635 are disclosed as being in sequence, the present example implementations are not limited thereto. For example but not by way of limitation, the operations of 630 and 635 may be performed sequentially, or as alternatives to one another, such that not both but only one of the operations of 630 or 635 is performed. Further, while the logic described with respect to operation 635 is shown to be associated with the chat function, the same logic may also be applied to operation 630 (e.g., browser instead of chat), as would be understood by those skilled in the art.

At 640, based on the interactions, simulations and inputs, the SPA is created to incorporate the foregoing information.

Accordingly, various operations associated with operation 602 are performed. Further operations associated with operation 603 are described as follows.

At 645, the created SPA is implemented into blockchain, including the incorporation of a state engine as explained above.

At 650, when a purchase order is required, the SPO may be generated automatically, in a manner that is compliant with the MSA, without a user being required to review the MSA manually, due to the presence of SPA, and due to the user interface and simulation features.

Figure 7:
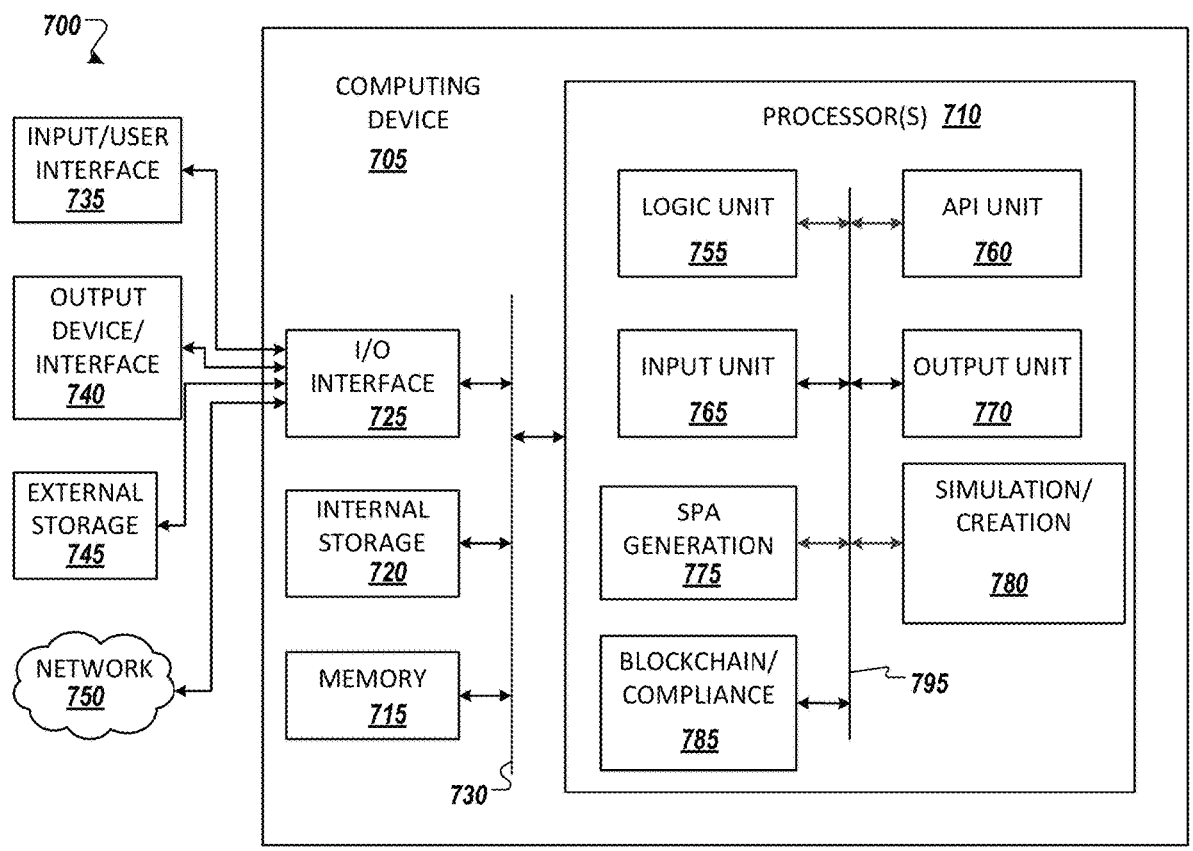
FIG. 7 is a functional block diagram of an example implementation of a computing environment according to the disclosure.

FIG. 7 is a functional block diagram of an embodiment of a computing environment according to the disclosure. A computing environment 700 with an example computer device 705 suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705. The environment 700 can support operations associated with the system 100, for example.

According to the present example implementations, the processing associated with the neural activity may occur on a processor 710 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 705 can be communicatively coupled to input/interface 735 and output device/interface 740. Either one or both of input/interface 735 and output device/interface 740 can be a wired or wireless interface and can be detachable. Input/interface 735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/interface 735 (e.g., user interface) and output device/interface 740 can be embedded with, or physically coupled to, the computing device 705. In other example implementations, other computing devices may function as, or provide the functions of, an input/interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like). The devices may include, but are not limited, having a location-determining device for navigation, such as a global positioning system (GPS) or the like. For example but not by way of limitation, the example implementations may be used for shipment tracking or tracking, as associated with purchase orders, shipment status, and SPA or SPA conditions.

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as, a server, client, thin server, general machine, special-purpose machine, or another label. For example but not by way of limitation, network 750 may include the blockchain network, and/or the cloud.

I/O interface 725 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, order and SPA generation unit 775, simulation/creation unit 780, blockchain/compliance unit 785, and inter-unit communication mechanism 795 for the different units (e.g., the encode 110 and the decoder 120) to communicate with each other, with the OS, and with other applications (not shown).

The order and SPA generation unit 775 can perform functions associated with receiving inputs, processing inputs, and generating the SPA. The simulation/creation unit 780 can receive the SPA and related information, perform simulation, receipt input via UI and/or chatbot, and create or modify SPAs based on the input and other information. The blockchain/compliance unit 785 can perform functions associated with the SPO generation, auditing and other aspects as explained above.

For example, the order and SPA generation unit 775, the simulation/creation unit 780, and the blockchain/compliance unit 785 may implement one or more processes shown above with respect to the structures and methods described above. The described units and elements can be varied in design, function, configuration, or implementation and are not limited to the descriptions provided.

In some example implementations, when information or an execution instruction is received by API unit 760, it may be communicated to one or more other units (e.g., logic unit 755, input unit 765, order and SPA generation unit 775, simulation/creation unit 780, and blockchain/compliance unit 785).

In some instances, the logic unit 755 may be configured to control the information flow among the units and direct the services provided by API unit 760, input unit 765, order and SPA generation unit 775, simulation/creation unit 780, and blockchain/compliance unit 785 in some example implementations described above. For example, the flow of one or more processes or implementations may be controlled by logic unit 755 alone or in conjunction with API unit 760.

Figure 8:
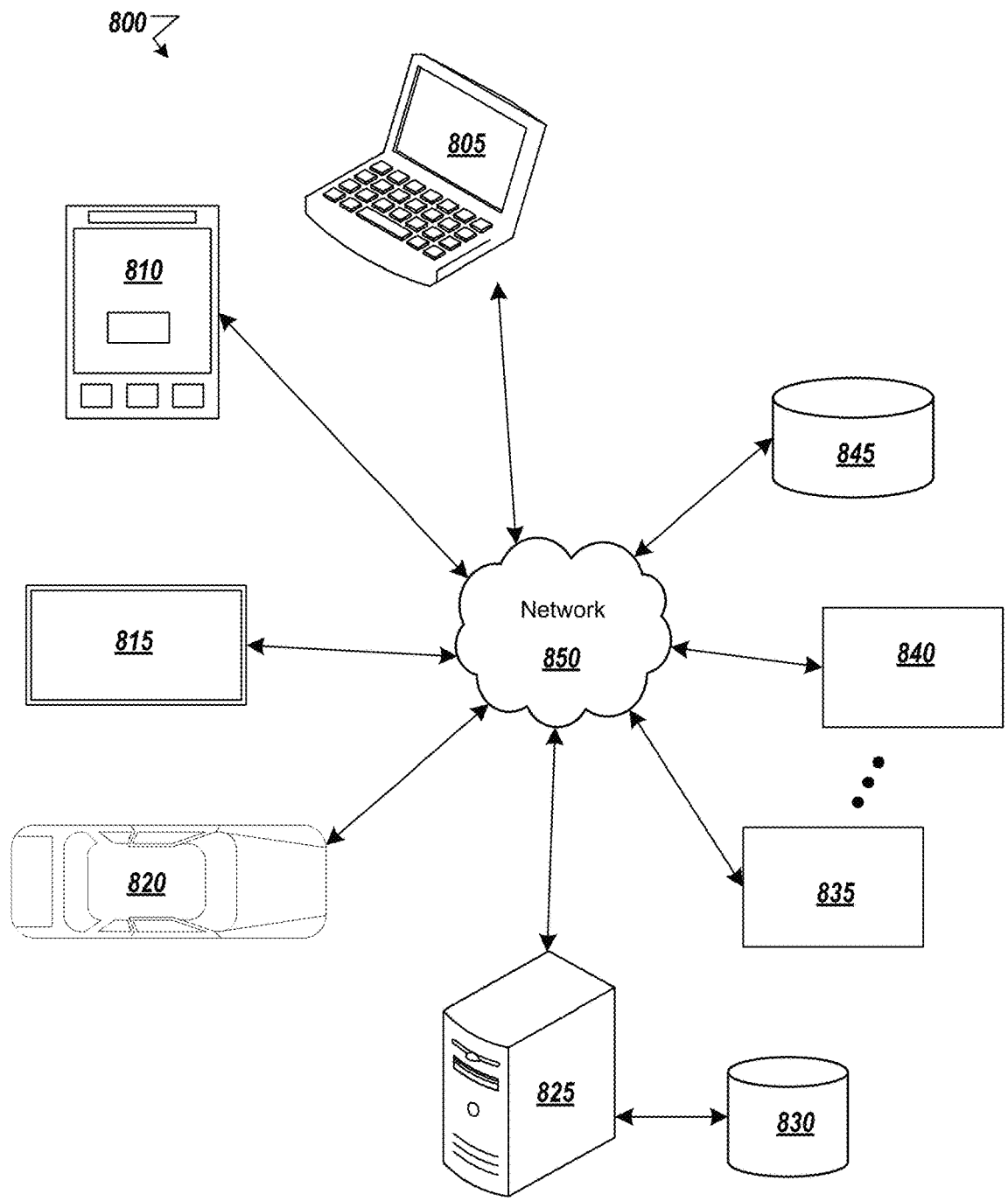
FIG. 8 is a functional block diagram of an exemplary operating environment according to the disclosure.

FIG. 8 is a functional block diagram of an exemplary operating environment according to the disclosure. An environment 800 can be suitable for some example implementations disclosed herein. Environment 800 includes devices 805-845, and each is communicatively connected to at least one other device via, for example, network 860 (e.g., by wired and/or wireless connections). Some devices may be communicatively connected to one or more storage devices 830 and 845.

An example of one or more devices 805-845 may be computing devices 705 described in FIG. 7, respectively. Devices 805-845 may include, but are not limited to, a computer 805 (e.g., a laptop computing device) having a monitor and an associated webcam as explained above, a mobile device 810 (e.g., smartphone or tablet), a television 815, a device associated with a vehicle 820, a server computer 825, computing devices 835-840, storage devices 830 and 845.

In some implementations, devices 805-820 may be considered user devices associated with the users, who may be remotely obtaining a sensed audio input used as inputs for the foregoing example implementations. In the present example implementations, one or more of these user devices 805-820 may be associated with one or more sensors such as microphones in a phone of a user or a purchase order processing device, that can sense information as needed for the present example implementations, as explained above.

The present example implementations may have various advantages and benefits. For example, not by way of limitation, the present example implementations may, in contrast to the related art, convert a master service agreement document to a smart purchase agreement that can simulate purchase orders and be written to the blockchain.

Related art approaches cannot automate contract compliance verification of transactions for MSAs for use in context-based and dynamic situations, at least due to their limitation to static price sheets, for example. Further, related art approaches do not provide a framework for operationalizing MSAs using reusable modules, or chaining together modules to create a smart purchase agreement. Related art approaches also do not address querying MSAs. The related art approaches also do not incorporate the structure and semantic knowledge from the corpus of similar legal documents along with context of real-time temporal events for logical processing of the MSA.

The present example implementations may provide for self-identifying modules to construct and enforce smart contract agreements. More specifically, modules may be provided to operationalize common causes in MSAs, and a coordinating service may match known modules against an MSA, as well as any applicable user provided rule bases and parameters, to construct the SPA. The user may add and create new modules, to address previously on address terms, and SPAs can be used to automatically generate an interface for buyers/sellers to create and submit SPOs conforming to the MSA. SPAs may be used to automatically generate interfaces that simulate outcomes of SPOs under various conditions according to the MSA. Further, the SPAs maybe queried using natural language, such as via a chat interface, to simulate contract outcomes of SPOs under various conditions. Further exceptions may be handled by a mutually agreed-upon exception handling protocol, which can be invoked to permit fair contract execution and settlement outside of the originally defined terms and conditions. Advantages may include but are not limited reducing of overhead, speeding up transactions, and increasing contract compliance.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:
   receiving one or more inputs associated with a master services agreement (MSA), and generating an output that includes smart contract information;
   training machine learning using historic user input;
   performing a simulation and receiving user input to interactively adjust the smart contract information using the machine learning and implement a smart purchase agreement (SPA) in blockchain and in a state engine, wherein the user input comprises at least one verbal query, the at least one verbal query is converted into a function and function parameters through the machine learning for performance of the simulation;
   automatically generating a smart purchase order (SPO) under the MSA, wherein the SPO is automatically validated for a conflict against the MSA in real-time to ensure compliance with the MSA, and for a case of a conflict, a conflict warning is provided.

2. The computer-implemented method of claim 1, wherein the receiving the one or more inputs comprises inputting the MSA information into an ingest service, and the generating the output comprises extracting the MSA to generate contract terms and definitions and unstructured clauses, matching each of the unstructured clauses for extraction of parameters and generation of pre-processed terms and conditions that comprises the smart contract information.

3. The computer-implemented method of claim 1, wherein a simulation and creation engine receives the smart contract information, performs simulation based on one or more rules, and obtains user input interactively, to generate and revise the SPA.

4. The computer-implemented method of claim 3, wherein the obtaining the user input interactively comprises interacting with an application or web browser based interface.

5. The computer-implemented method of claim 3, wherein the obtaining the user input interactively comprises applying natural language processing to receive and transmit chat information, where in the received chat information is applied to the simulation to automatically generate a response to the user that includes a revised SPA.

6. The computer-implemented method of claim 1, further comprising:
  receiving information associated with an exception condition;
  applying the information associated with the exception condition to the SPA to generate the simulation;
  in response to a request, generating a modification to the SPA or the SPO in accordance with the exception condition; and
  applying the modification to the SPA or the SPO to the simulation to generate a revised simulation, and generating an exception recommendation based on the revised simulation.

7. The computer-implemented method of claim 1, wherein the SPO is generated based on a set of rules and parameters associated with contract positions of a party to the MSA, and for a conflict between the SPA and the set of rules and parameters, a suggestion of a revision to the SPA is generated.

8. A non-transitory computer readable medium including instructions executable on a processor, the instructions comprising:
  receiving one or more inputs associated with a master services agreement (MSA), and generating an output that includes smart contract information;
  training machine learning using historic user input;
  performing a simulation and receiving user input to interactively adjust the smart contract information using the machine learning and implement a smart purchase agreement (SPA) in blockchain and in a state engine, wherein the user input comprises at least one verbal query, the at least one verbal query is converted into a function and function parameters through the machine learning for performance of the simulation;
  automatically generating a smart purchase order (SPO) under the MSA, wherein the SPO is automatically validated for a conflict against the MSA in real-time to ensure compliance with the MSA, and for a case of a conflict, a conflict warning is provided.

9. The non-transitory computer readable medium of claim 8, wherein the receiving the one or more inputs comprises inputting the MSA information into an ingest service, and the generating the output comprises extracting the MSA to generate contract terms and definitions and unstructured clauses, matching each of the unstructured clauses for extraction of parameters and generation of pre-processed terms and conditions that comprises the smart contract information.

10. The non-transitory computer readable medium of claim 8 wherein a simulation and creation engine receives the smart contract information, performs simulation based on one or more rules, and obtains user input interactively, to generate and revise the SPA.

11. The non-transitory computer readable medium of claim 10, wherein the obtaining the user input interactively comprises interacting with an application or web browser based interface.

12. The non-transitory computer readable medium of claim 10, wherein the obtaining the user input interactively comprises applying natural language processing to receive and transmit chat information, where in the received chat information is applied to the simulation to automatically generate a response to the user that includes a revised SPA.

13. The non-transitory computer readable medium of claim 8, further comprising:
  receiving information associated with an exception condition;
  applying the information associated with the exception condition to the SPA to generate the simulation;
  in response to a request, generating a modification to the SPA or the SPO in accordance with the exception condition; and
  applying the modification to the SPA or the SPO to the simulation to generate a revised simulation, and generating an exception recommendation based on the revised simulation.

14. The non-transitory computer readable medium of claim 8, wherein the SPO is generated based on a set of rules and parameters associated with contract positions of a party to the MSA, and for a conflict between the SPA and the set of rules and parameters, a suggestion of a revision to the SPA is generated.

15. A system, comprising:
  a processor configured to receive one or more inputs associated with a master services agreement (MSA), and generating an output that includes smart contract information;
  the processor is configured to train machine learning using historic user input;
  the processor is configured to perform a simulation and receiving user input to interactively adjust the smart contract information using the machine learning and implement a smart purchase agreement (SPA) in blockchain and in a state engine, wherein the user input comprises at least one verbal query, the at least one verbal query is converted into a function and function parameters through the machine learning for performance of the simulation;
  the processor is configured to automatically generate a smart purchase order (SPO) under the MSA, wherein the SPO is automatically validated for a conflict against the MSA in real-time to ensure compliance with the MSA, and for a case of a conflict, a conflict warning is provided.

16. The system of claim 15, wherein the receive the one or more inputs comprises inputting the MSA information into an ingest service, and the generating the output comprises extracting the MSA to generate contract terms and definitions and unstructured clauses, matching each of the unstructured clauses for extraction of parameters and generation of pre-processed terms and conditions that comprises the smart contract information.

17. The system of claim 15, wherein a simulation and creation engine receives the smart contract information, performs simulation based on one or more rules, and obtains user input interactively, to generate and revise the SPA.

18. The system of claim 17, wherein the obtain the user input interactively comprises interacting with an application or web browser based interface, and wherein the obtaining the user input interactively comprises applying natural language processing to receive and transmit chat information, where in the received chat information is applied to the simulation to automatically generate a response to the user that includes a revised SPA.

19. The system of claim 15, further comprising:
   the processor is further configured to receive information associated with an exception condition;
   the processor is further configured to apply the information associated with the exception condition to the SPA to generate the simulation;
   in response to a request, the processor is further configured to generate a modification to the SPA or the SPO in accordance with the exception condition; and
   the processor is further configured to apply the modification to the SPA or the SPO to the simulation to generate a revised simulation, and generating an exception recommendation based on the revised simulation.

20. The system of claim 15, wherein the SPO is generated based on a set of rules and parameters associated with contract positions of a party to the MSA, and for a conflict between the SPA and the set of rules and parameters, a suggestion of a revision to the SPA is generated.

* * * * *